(12) United States Patent
Haque et al.

(10) Patent No.: US 12,181,598 B2
(45) Date of Patent: Dec. 31, 2024

(54) STABLE AND ACCURATE INDOOR LOCALIZATION BASED ON PREDICTIVE HYPERBOLIC LOCATION FINGERPRINTING

(71) Applicant: INNERSPACE TECHNOLOGY INC., Ontario (CA)

(72) Inventors: Rafat Haque, Richmond Hill (CA); Matthew Macgillivray, Toronto (CA); Sean Nyman, Toronto (CA)

(73) Assignee: INNERSPACE TECHNOLOGY INC., Newmarket (CA)

( * ) Notice: Subject to any disclaimer, the term of this patent is extended or adjusted under 35 U.S.C. 154(b) by 359 days.

(21) Appl. No.: 17/770,827

(22) PCT Filed: Oct. 21, 2020

(86) PCT No.: PCT/CA2020/051412
§ 371 (c)(1),
(2) Date: Apr. 21, 2022

(87) PCT Pub. No.: WO2021/077218
PCT Pub. Date: Apr. 29, 2021

(65) Prior Publication Data
US 2023/0003830 A1 Jan. 5, 2023

Related U.S. Application Data

(60) Provisional application No. 62/923,840, filed on Oct. 21, 2019.

(51) Int. Cl.
*G01S 5/02* (2010.01)
*G01S 5/12* (2006.01)
(Continued)

(52) U.S. Cl.
CPC ............ *G01S 5/02525* (2020.05); *G01S 5/12* (2013.01); *H04B 17/318* (2015.01); *H04W 24/10* (2013.01); *H04W 64/00* (2013.01)

(58) Field of Classification Search
CPC ...... G01S 5/0252; G01S 5/02525; G01S 5/12; H04B 17/318; H04W 24/10; H04W 64/00; H04W 4/38
See application file for complete search history.

(56) References Cited

U.S. PATENT DOCUMENTS 10,228,437 B2 * 3/2019 Roquel ................ G01S 5/0294
2017/0356979 A1 * 12/2017 Georgiou ............. H04W 4/023
(Continued)

FOREIGN PATENT DOCUMENTS

| CA | 2992793 A1 | 1/2017 |
| EP | 3652559 A1 | 5/2020 |

OTHER PUBLICATIONS

International Search Report mailed Dec. 16, 2020 for International Application No. PCT/CA2020/051412.
(Continued)

*Primary Examiner* — Siu M Lee
(74) *Attorney, Agent, or Firm* — Harness, Dickey & Pierce, P.L.C.

(57) ABSTRACT

A computer-implemented method for precision hyperbolic location fingerprinting, the method comprising, at a computing system, the steps of: (a) receiving measured RSSI values associated with a plurality of fixedly-positioned sensor devices, wherein the plurality of fixedly-positioned sensor devices are stationary in known locations in a 2D environment and caused to transit radio signals to each other and measure characteristics of the received radio signals; (b) generating a raw RSSI fingerprint for each sensor device based on the measured RSSI values; (c) generating a log-ratio RSSI fingerprint between a pair of sensor devices; (d)
(Continued)

normalizing the raw RSSI fingerprint and normalizing the log-ratio RSSI fingerprint; (e) combining the raw RSSI fingerprint and the log-ratio RSSI fingerprint to form a fusion RSSI fingerprint; and (f) repeating steps (a) to (e) at predetermined intervals to enhance prediction accuracy of regional fingerprints within the environment.

30 Claims, 3 Drawing Sheets

(51) Int. Cl.
    *H04B 17/318*     (2015.01)
    *H04W 24/10*     (2009.01)
    *H04W 64/00*     (2009.01)

(56) References Cited

U.S. PATENT DOCUMENTS

2017/0357523 A1    12/2017    Benson et al.
2021/0364625 A1*    11/2021    Li ........................ G01S 7/0232

OTHER PUBLICATIONS

Written Opinion for International Application No. PCT/CA2020/051412 mailed Dec. 16, 2020.

* cited by examiner

STABLE AND ACCURATE INDOOR LOCALIZATION BASED ON PREDICTIVE HYPERBOLIC LOCATION FINGERPRINTING

CROSS-REFERENCE TO RELATED APPLICATIONS

The present disclosure is the U.S. national phase of PCT Application PCT/CA2020/051412 filed on Oct. 21, 2020, which claims a priority of U.S. application Ser. No. 62/923, 840, filed on Oct. 21, 2019, and relates to methods and systems for indoor location, which is incorporated herein by reference in its entirety.

FIELD

The present disclosure relates to methods and systems for indoor location.

BACKGROUND

With the fast growth of ubiquitous computing, the rapid advances in mobile devices, and the availability of wireless communication, wireless indoor positioning systems have become very popular in recent years. However, the indoor location market has been slow to grow due to existing limitations with smartphone and WiFi infrastructure resulting in a need for highly customized solutions and professional services engagements. Current indoor location techniques are cost-prohibitive and the results often do not meet the location fidelity required to be useful. In addition, current indoor techniques are incapable of delivering services reliably and accurately, such as navigation, just-in-time messaging, and on-demand services. Accurate indoor location is especially required when delivering Enhanced 911 services (E911) mandated by governments for network providers to support the identification of a person's location indoors at the time a 911 call is placed. Generally, E911 services employ some form of radiolocation from the cellular network and location coordinates based on a Global Positioning System (GPS) receiver built into the mobile device itself to determine the location of a mobile device. However, these two techniques do not function well indoors, and therefore the E911 location reported to emergency responders is only accurate to a point. For example, in the United States, nationwide service providers must achieve 50-meter horizontal location accuracy or provide a dispatchable location for 70 percent of all wireless 911 calls by the year 2021. Accordingly, the E911 location generally comprises an address and perhaps a general description of the mobile device's location. Also, if a call is dropped before the location details are provided, emergency response teams are effectively blind, particularly in large public spaces like a shopping mall, real estate tower, or museum.

Radio frequency (RF) fingerprinting-based techniques for localization are a promising approach for ubiquitous positioning systems, particularly indoors. However, the accuracy and stability of WiFi-based localization is a major barrier to the growth of the indoor location market beyond basic analytics and occupancy trend analysis. For example, some major corporations have made significant investments in both their tech and on-campus services to support employees with accessibility needs, however wayfinding continues to elude them because accuracy within feet, not metres, has been a non-starter to-date.

In other implementations, location fingerprinting is used, and entails representing a single floorplan into a 2D grid and having a person visit each grid cell and record the absolute signal strengths from all anchor devices in that grid to obtain cell fingerprints. However, this method is not only time-consuming, costly and inefficient, but it is also not accurate, and therefore cannot be relied upon. However, absolute signal strengths are unstable since signal strength is impacted by various factors, such as distance, obstacles, or placing a mobile device in one's pocket, etc. As a result, absolute strengths are not a reliable predictor of distance e.g. placing a mobile device one's pocket has the equivalent effect of placing the mobile device at a distance farther away from the anchor device, and so that act can severely distort the true distance of the mobile device from an anchor device. Furthermore, each cell's fingerprinting becomes less reliable as time progresses, because environmental changes greatly influence electromagnetic wave propagation through the space, such as the number of people, temperature, humidity, furniture, other electronic devices, etc.

In order to support use cases that require higher accuracy and stability of location data, specialized sensors such as optical occupancy sensors would need to be deployed. This has tremendous impact on cost, as these sensors require far higher density and additional infrastructure. As cost and accuracy are key purchase decision factors for customers across commercial real estate, retail food services and corporate office space, the return on investment in current indoor location solutions is difficult for most buyers to rationalize because of the limited use case available with lower cost, WiFi-based solution.

It is an object of the present disclosure to mitigate or obviate at least one of the above-mentioned disadvantages.

SUMMARY

In one of its aspects, there is provided a computer-implemented method for precision hyperbolic location fingerprinting, the method comprising, at a computing system, the steps of:

(a) receiving measured RSSI values associated with a plurality of fixedly-positioned sensor devices, wherein the plurality of fixedly-positioned sensor devices are stationary in known locations in a 2D environment and caused to transit radio signals to each other and measure characteristics of the received radio signals;

(b) generating a raw RSSI fingerprint for each sensor device based on the measured RSSI values;

(c) generating a log-ratio RSSI fingerprint between a pair of sensor devices;

(d) normalizing the raw RSSI fingerprint and normalizing the log-ratio RSSI fingerprint;

(e) combining the raw RSSI fingerprint and the log-ratio RSSI fingerprint to form a fusion RSSI fingerprint; and (f) repeating steps (a) to (e) at predetermined intervals to enhance prediction accuracy of regional fingerprints within the environment.

In another of its aspects, there is provided a method for indoor location comprising the steps of:

(a) fixedly-positioning a first sensor device in a first known location in an environment and fixedly-positioning a second sensor device in a second known location in the environment;

(b) causing the first sensor device to transmit a first radio signal to the second sensor device, and causing the second sensor device to transmit a second radio signal to the first sensor device;

(c) at the first sensor device, measuring a received signal strength indicator (RSSI) value of the second radio signal, and at the second sensor device, measuring a received RSSI value of the first radio signal;

(d) generating at least one Friis equation for each of the first radio signal and the second radio signal;

(e) generating a fusion RSSI fingerprint based on a raw RSSI fingerprint and a log-ratio RSSI fingerprint, the fusion RSSI fingerprint comprising a level of accuracy based on a number (N) of sensor devices within the spatial environment; and (f) repeating steps (a) to (e) at predetermined intervals to enhance prediction accuracy of regional fingerprints within the environment.

In another of its aspects, there is provided a system for predicting cell fingerprints comprising:

a computing system comprising a processor and a memory storing instructions executable by the processor to cause the processor to at least:

receive measured RSSI values associated with a plurality of fixedly-positioned sensor devices, wherein the plurality of fixedly-positioned sensor devices are stationary in known locations in an environment and caused to transit radio signals to each other and measure characteristics of the received radio signals;

generate at least one Friis equation for each of the received radio signals, to generate a raw RSSI fingerprint for each sensor device;

generate a log-ratio RSSI fingerprint between a pair of sensor devices;

normalize the raw RSSI fingerprint and normalize the log-ratio RSSI fingerprint;

combine the raw RSSI fingerprint and the log-ratio RSSI fingerprint to form a fusion RSSI fingerprint comprising a level of accuracy based on a number (N) of sensor devices within the environment; and receive updated receive measured RSSI values at predetermined intervals to enhance prediction accuracy of regional fingerprints within the environment.

Advantageously, the present system and method avoids physically surveying the space by predicting cell fingerprints using control signals sent/received by the sensor network; and enables support for use cases requiring higher accuracy and stability (such as wayfinding or real-time desk occupancy) using WiFi sensors that are associated with lower costs and have far wider coverage. By finding unique fingerprints of RF signals received at different locations within a predefined area beforehand, whenever a similar fingerprint is subsequently seen again, the localization system is able to infer a user's current location.

In addition, precision hyperbolic location fingerprinting (HLF) exploits already existing public infrastructure, which results in advantages such as cost efficiency, operational practicability, and pervasive availability. For example, these methods are applicable to commercial WiFi access points to enable high accuracy localization at scale. Another benefit of accurate HLF is the ability to provide indoor wayfinding and/or navigation, not just to help people find their way around a building, but to support people with accessibility needs.

The HLF techniques employ algorithm that enable a ratio-based localization, rather than absolute signal strengths, which overcome stability issues related to client signal strength variations inherent to localization strategies based on absolute signal strength, such as in prior art trilateration methods. Accordingly, distance can be reasonably inferred using signal strength ratios rather than absolute signal strength measurements. Using the measured signal characteristics associated with the sensor devices, cell fingerprints can be predicted, thus eliminating the onerous requirement of a manual site survey to establish required cell fingerprints. The overall accuracy of the location prediction is improved through dynamic and near real time re-calibration of the cell fingerprints to accommodate changing electromagnetic conditions that influence wave propagation through an indoor space.

DETAILED DESCRIPTION

Figure 1:
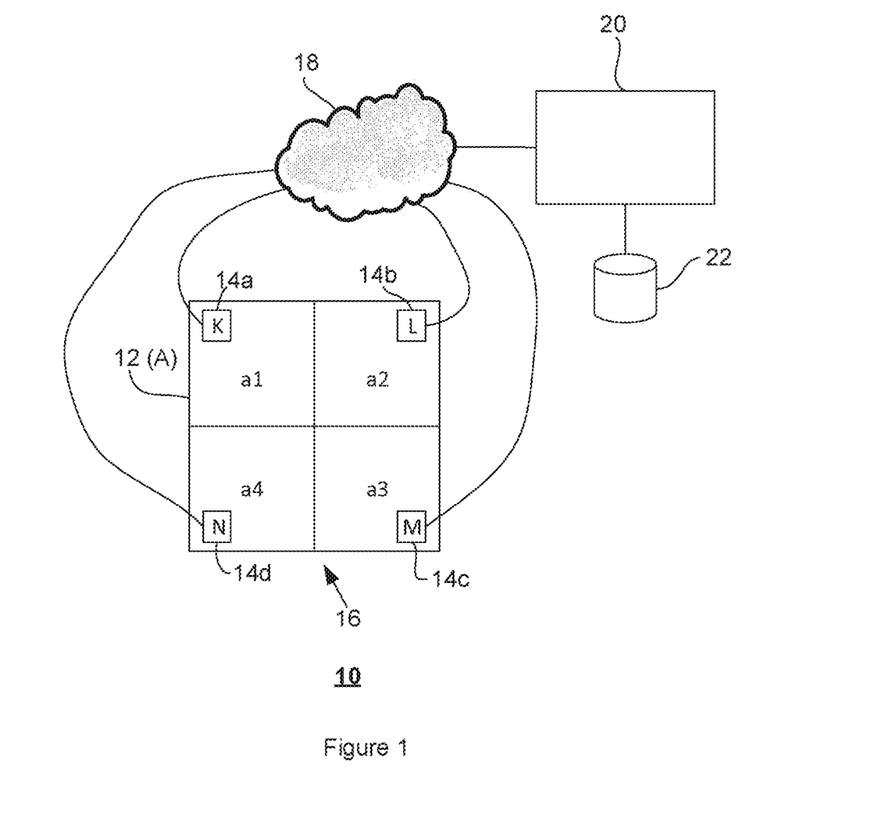
FIG. 1 shows a top-level component architecture diagram of a system for implementing precision hyperbolic location fingerprinting.

Referring to FIG. 1 there is shown a top-level component architecture diagram of a system for implementing precision hyperbolic location fingerprinting (HLF) for cell-based localization, i.e. locations are represented as cells, as shown generally by reference numeral 10. Sensor devices 14$n$, such as sensor devices 14$a$ (K), 14$b$ (L), 14$c$ (M), and 14$d$ (N) are fixedly-positioned in known locations in an environment, such that sensor devices 14$n$ are stationary, and are associated with fixed geo-coordinates that remain unchanged with time. As an example, the environment may be a building floor, and so the floor plan may be converted into a grid represented by area A (2D), and the locations of sensor devices 14$n$ are indicated on the grid. The predictive HLF method surveys an area (A) 12 by predicting cell fingerprints using control signals sent/received by a plurality of sensor devices 14$a$ (K), 14$b$ (L), 14$c$ (M), and 14$d$ (N), in a sensor network 16, positioned within an environment, such as, area 12, rather than using prior art methods which entail physically surveying the space. For indoor spaces, a cell may correspond to a room or a part of it, or a section of a hallway. Accordingly, area A comprises a finite set of cells $\{a_1, \ldots, a_n\}$ covered by the sensor network 16 system. Sensor devices 14$n$ survey area A and collect samples comprising a set of same-time same-place observations, one for each sensor device 14$n$, and a set of samples collected within the same cell form a fingerprint. System 10 estimates positions by recognizing position-related patterns in measurements, and encodes patterns in a radio map based on the fingerprints, and the radio map contains a mapping for each encoded pattern to a position.

Accordingly, each sensor device 14$n$ transmits control signals to other sensors 14$n$, and via network 18 to server computer 20, such that server computer 20 receives the individual control signals from each of sensor devices 14$a$ (K), 14$b$ (L), 14$c$ (M), and 14$d$ (N), and server computer 20 predict values within the remaining unknown cells using estimations methods. For example, the estimation method used for predicting locations from a radio map and currently measured network characteristics is deterministic i.e. estimate location by considering measurements only by their value. Accordingly, a model may be built using a classification method based on Support Vector Machine (SVM) or any other machine learning (ML) algorithms for fingerprint-based indoor localization, based on the signal strength received from sensor devices 14n. These predictions are refreshed periodically at predetermined intervals e.g. every 5 s, to accommodate for changes in the 3-D spatial volume 12 and maintain accuracy. System 10 thus provides a simpler deployment strategy and a more relevant fingerprint over the long term. Additionally, the techniques are applicable to a 3D grid, leveraging the availability of sensor network 16 across multiple floors in a building.

Figure 2:
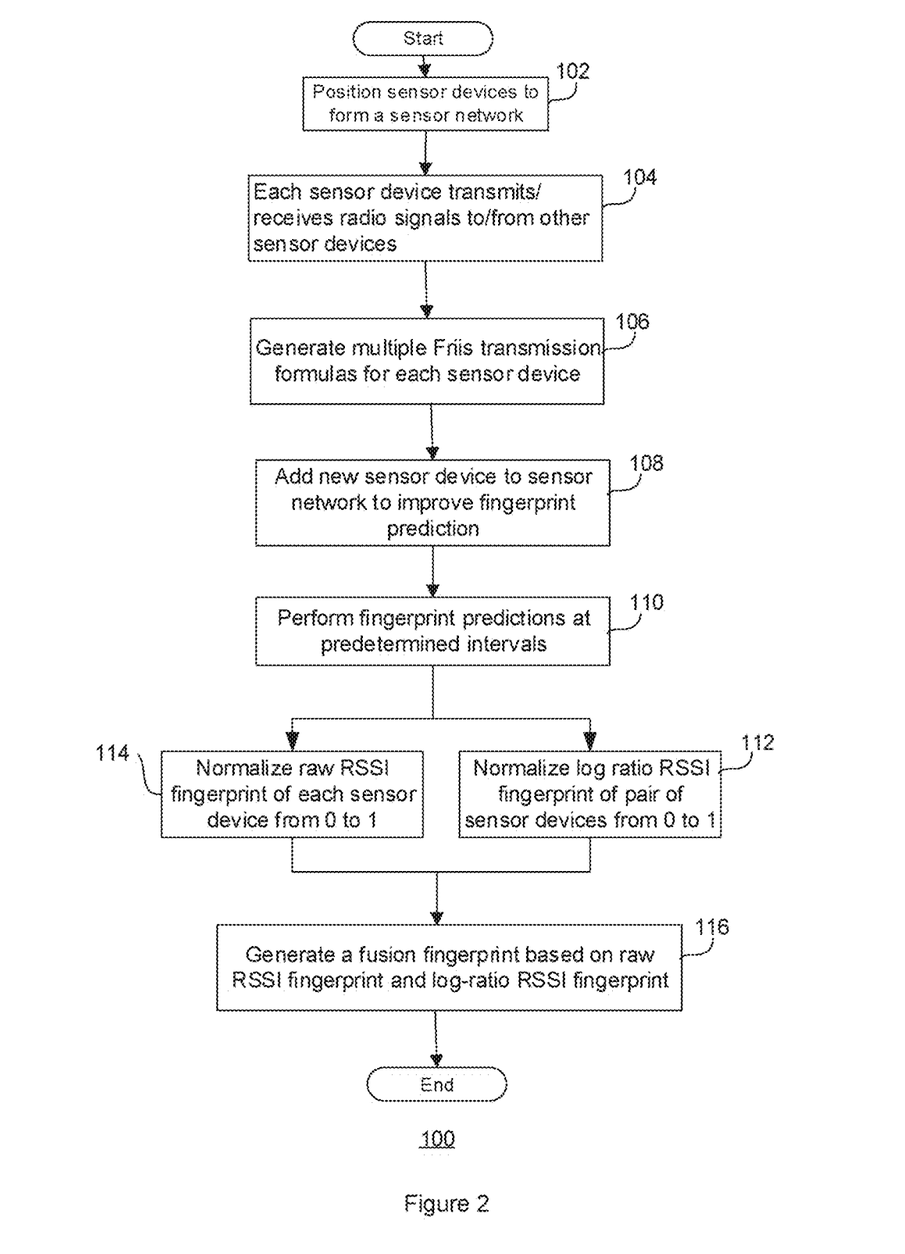
FIG. 2 shows a flowchart outlining exemplary steps for implementing precision hyperbolic location fingerprinting.

FIG. 2 shows flowchart 100 outlining exemplary steps for implementing stable and accurate indoor localization based on predictive hyperbolic location fingerprinting. In step 102, devices 14n are fixedly-positioned in known locations in an environment, such that sensor devices 14n are stationary. As an example, the environment may be a building floor, and so the floor plan may be converted into a grid represented by area A, and the locations of sensor devices 14n are indicated on the grid. Next, sensor device 14a is caused to transmit radio signals which are received by sensor device 14b (L), and in turn, sensor device 14b transmits radio signals which are received by sensor device 14a (K), step 104. Depending on the environment of 3D-spatial volume 12, the radio waves between sensor device 14a (K) and sensor device 14b (L) propagate in a very different manner in the near-field and in the far-field. The Friis transmission equation characterises the receiver at sensor device 14b (L) and transmitter at sensor device 14a (K) theoretical power-distance relationship, assuming a certain receive and transmit antenna gain, as well as a certain separation between these antennas, as the following:

$$\frac{P_r}{P_t} = G_t G_r \left(\frac{\lambda}{4\pi R}\right)^2$$

where Pr is the power at the receiving antenna; Pt is the output power of transmitting antenna; Gt and Gr represent the gain of the transmitting antenna and receiving antenna, respectively and $\lambda$ is the wavelength, while R is the distance between the antennas. Accordingly, to derive a valid equation of sensor device 14a (K), 14b (L), the technical details of the radios, such as transmission power, transmit antenna gain, receiving antenna gain etc. would be required. However, even if the radio modules from the same manufacturer, deriving those values is challenging, time consuming and can not be performed in near-real time. Therefore, in one implementation a Friis equation for each sensor device 14n is generated dynamically without requiring the technical details of each of the radios associated with sensor device 14a (K) or 14b (L). Using simple regression, a simplified version of the Friis equation is generated:

$$L = -10n\log(d) + A$$

where A is the Received Signal Strength Indicator (RSSI) value at a 1-metre distance; n is the path-loss exponent; d is the distance in metres; and L is the distance between the transmitting device e.g. sensor device 14a (K) and receiving device, e.g. sensor device 14b (L), in metres.

The RSSI value is measured at each sensor device 14n, and transmitted to server computer 20 for storage in fingerprint database 22, such that each RSSI measurement is associated with each sensor device 14n an cell identity ($a_1 \ldots a_n$). Fingerprint database 22 also stores map data relating covered area A.

Server computer 20 accesses database 22 and estimates their location based on RSSI measurements conducted at sensor device 14n using estimations described above. The measured RSSI values are either transmitted on request, or sensor device 14n updates them periodically with location server 20, according to a pre-defined update interval. Server computer 20 uses the measured RSSI values to generate multiple Friis transmission formulas for each sensor device 14n. Accordingly, each of anchor devices 14n pairs with another anchor device 14n and generates a Friis equation that represents the characteristics of the region the radio signal originated from (step 106). In an implementation with four anchor devices 14a (K), 14b (L), 14c (M), and 14d (N) positioned in separate quadrants $a_1 \ldots a_n$ in a 2D-space represented by numeral 20, then each quadrant $a_1 \ldots a_n$ is associated with four equations for each anchor device 14a (K), 14b (L), 14c (M), or 14d (N), as shown in Table 1:

TABLE 1

| Quadrant 1 | Quadrant 2 | Quadrant 3 | Quadrant 4 |
|---|---|---|---|
| $K => PF\begin{pmatrix} L \\ MK \\ N \end{pmatrix}$ | K => PF (L K) | K => PF (N K) | M => PF (M K) |
| L => PF (K L) | $L => PF\begin{pmatrix} K \\ ML \\ N \end{pmatrix}$ | L => PF (N L) | L => PF (M L) |
| M => PF (K M) | M => PF (L M) | M => PF (N M) | $M => PF\begin{pmatrix} L \\ MM \\ K \end{pmatrix}$ |
| N => PF (K L) | N => PF (L N) | $N => PF\begin{pmatrix} K \\ LN \\ M \end{pmatrix}$ | N => PF (N M) |

This step is key to predicting the regional fingerprints of an area covered by an anchor device 14a (K), 14b (L), 14c (M), or 14d (N). In order to improve fingerprint prediction in an area, a new anchor 14n is deployed in the area, and configured to be part of the sensor network 16, and each 14a (K), 14b (L), 14c (M), or 14d (N) starts pairing with the newly added anchor device 14n and starts calibrating automatically, step 108. For each cell $a_1 \ldots a_n$, the fingerprint is predicted based on the path loss formulas generated in the previous step 106.

In prior art methods WiFi RSSI fingerprints are collected manually by walking around an indoor space and creating a database of fingerprint paired with their location ground truth. Even after manual fingerprint collection, the biggest challenge is the fact that fingerprint gets stale over time. In contrast, in this exemplary implementation, RSSI fingerprints are automatically predicted based on the formulas generated in step 106, without any manual means or human intervention. In step, 110, these predictions are refreshed periodically at predetermined intervals e.g. every 5 s, to accommodate for changes in the 3-D spatial volume 12 and thus maintain accuracy and currency of the fingerprints.

Generally, raw RSSI fingerprints yield reasonably satisfactory results in line-of-sight scenarios between anchors devices 14a (K), 14b (L), 14c (M), and 14d (N), however, implementations using raw RSSI fingerprints are prone to failure when presented with relatively low signal strengths. There are several reasons that can be attributed to such low signal strengths, such as inequalities in hardware, firmware and lack of standardization, including noise, obstacles, multipath and fading phenomena. For example, in some instances there may be differences of −30 dBm in the same location.

In step 112, a log-ratio RSSI fingerprint, which is also known as hyperbolic location fingerprinting (HLF), is determined to overcome the signal strength problem. Accordingly, each imprint of a fingerprint is the signal-strength ratio between a pair of anchor devices e.g. 14a (K) and 14b (L), instead of an absolute signal strength, and the position estimates are found as the intersection of a number of hyperbolas each describing the ratio difference between unique pairs of anchor devices e.g. 14a (K) and 14b (L). Table 2 shows exemplary raw RSSI fingerprints for each of sensor devices 14n in area A, and the hyperbolic fingerprints generated by normalized log ratio RSSI fingerprints of pairs of sensor devices 14n. For example, the normalized log ratio for the pair of anchor devices 14a (K) and 14b (L) is calculated using the following formula:

NLR(KL)=Normalize Log Ratio of K and L where:
K =RSSI detected by Anchor K;
L =RSSI detected by Anchor L;
then:
x=|K÷L|
r=max(0.01, x)
NLR=normalize(log(r)−log(0.01))

TABLE 2

In step 114, the raw RSSI fingerprint for each sensor device 14n is normalized from 0 to 1, and in step 116, the normalized raw RSSI fingerprint and the normalized hyperbolic fingerprints using a single-dimensional vector to represent a location are combined to generate a fusion fingerprint. The number of dimensions in a fusion fingerprint is represented by:

Dimensions=$N+C(N,2)=N+N!/(2!(N-2)!)$ where N is the number of anchor devices deployed. As an example, if an area has 5 sensor devices 14n deployed, then each fusion fingerprint is made up of 15 dimensions of fingerprint data. Generally, indoor areas have a high HLF precision because the high number of obstructions makes fingerprints more distinctive and thereby easier for HLF system to recognize. Indoor areas also tend to be smaller which makes it practical to increase precision by collecting a denser set of fingerprints. Furthermore, indoor areas are normally covered with a denser set of sensor devices 14n which also increase precision.

In another implementation, sensor devices 14a (K), 14b (L), 14c (M), and 14d (N) are deployed at different altitudes (e.g. placed on different floors of a building), enabling the expansion of the fusion fingerprint map into a 3D grid.

In another implementation, sensor devices 14n are wireless access points distributed in a covered area, such that the wireless access points are communicatively coupled to server computer 20 via network 18.

In another implementation, sensor devices 14n, such as wireless access points, measure the RSSI values of their clients and forward these measurements to server computer 20.

Figure 3:
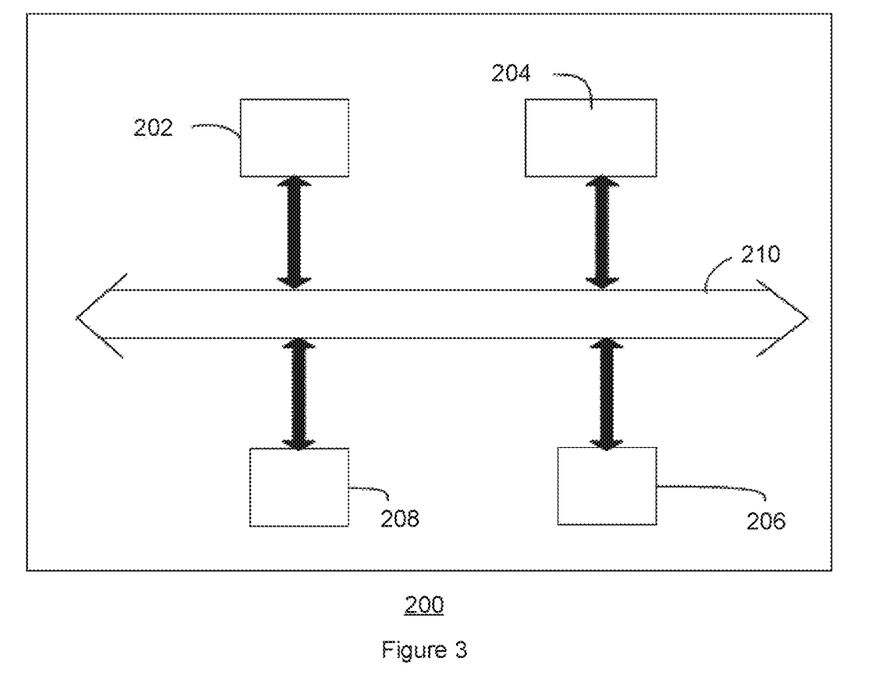
FIG. 3 shows an exemplary computing system for executing estimation methods for precision hyperbolic location fingerprinting.

In another implementation, server computer 20 comprises computing system 200 comprising at least one processor such as processor 202, at least one memory such as memory 204, input/output (I/O) module 206 and communication interface 208, as shown in FIG. 3. Although computing system 200 is depicted to include only one processor 202, computing system 200 may include a greater number of processors therein. In an embodiment, memory 204 is capable of storing instructions. Further, the processor 202 is capable of executing instructions.

In one implementation, processor 202 may be configured to execute hard-coded functionality. In an embodiment, processor 202 may be embodied as an executor of software instructions, wherein the software instructions may specifically configure processor 202 to perform algorithms and/or operations described herein when the software instructions are executed.

In one implementation, processor 202 may be embodied as a multi-core processor, a single core processor, or a combination of one or more multi-core processors and one or more single core processors. For example, processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, Application-Specific Standard Products (ASSPs), System-on-a-chip systems (SOCs), Complex Programmable Logic Devices (CPLDs), Graphics Processing Units (GPUs), and the like. For example, some or all of the device functionality or method sequences may be performed by one or more hardware logic components.

Memory 204 may be embodied as one or more volatile memory devices, one or more non-volatile memory devices, and/or a combination of one or more volatile memory devices and non-volatile memory devices. For example, memory 204 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY™ Disc), and semiconductor memories (such as mask ROM, PROM (programmable ROM), EPROM (erasable PROM), flash ROM, RAM (random access memory), etc.).

I/O module 206 is configured to facilitate provisioning of an output to a user of computing system 200 and/or for receiving an input from the user of computing system 200. I/O module 206 is configured to be in communication with processor 202 and memory 204. Examples of the I/O module 206 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, processor 202 may include I/O circuitry configured to control at least some functions of one or more elements of I/O module 206, such as, for example, a speaker, a microphone, a display, and/or the like. Processor 202 and/or the I/O circuitry may be configured to control one or more functions of the one or more elements of I/O module 206 through computer program instructions, for example, software and/or firmware, stored on a memory, for example, the memory 204, and/or the like, accessible to the processor 202.

Communication interface 208 enables computing system 200 to communicate with other entities over various types of wired, wireless or combinations of wired and wireless networks, such as for example, the Internet. In at least one example embodiment, the communication interface 208 includes transceiver circuitry configured to enable transmission and reception of data signals over the various types of communication networks. In some embodiments, communication interface 208 may include appropriate data compression and encoding mechanisms for securely transmitting and receiving data over the communication networks. Communication interface 208 facilitates communication between computing system 200 and I/O peripherals.

In an embodiment, various components of computing system 200, such as processor 202, memory 204, I/O module 206 and communication interface 208 may be configured to communicate with each other via or through a centralized circuit system 210. Centralized circuit system 210 may be various devices configured to, among other things, provide or enable communication between the components (202-208) of computing system 200. In certain embodiments, centralized circuit system 210 may be a central printed circuit board (PCB) such as a motherboard, a main board, a system board, or a logic board. Centralized circuit system 210 may also, or alternatively, include other printed circuit assemblies (PCAs) or communication channel media.

It is noted that various example embodiments as described herein may be implemented in a wide variety of devices, network configurations and applications.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, server computers, minicomputers, mainframe computers, and the like. Accordingly, system 10 may be coupled to these external devices via the communication, such that system 10 is controllable remotely. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In another implementation, system 10 follows a cloud computing model, by providing an on-demand network access to a shared pool of configurable computing resources (e.g., servers, storage, applications, and/or services) that can be rapidly provisioned and released with minimal or nor resource management effort, including interaction with a service provider, by a user (operator of a thin client). Accordingly, sensor devices 14n transmit RSSI measurements to a cloud computing platform for processing and location prediction using machine learning algorithms, and other techniques.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method for precision hyperbolic location fingerprinting, the method comprising, at a computing system, the steps of:
   (a) receiving measured RSSI values associated with a plurality of fixedly-positioned sensor devices, wherein the plurality of fixedly-positioned sensor devices are stationary in known locations in a 2D environment and caused to transit radio signals to each other and measure characteristics of the received radio signals;
   (b) generating a raw RSSI fingerprint for each sensor device based on the measured RSSI values;
   (c) generating a log-ratio RSSI fingerprint between a pair of sensor devices;
   (d) normalizing the raw RSSI fingerprint and normalizing the log-ratio RSSI fingerprint;
   (e) combining the normalized raw RSSI fingerprint and the normalized log-ratio RSSI fingerprint to form a fusion RSSI fingerprint; and
   (f) repeating steps (a) to (e) at predetermined intervals to enhance prediction accuracy of regional fingerprints within the environment; and
   wherein the computing system generates at least one Friis equation for each of the received radio signals, wherein the at least one Friis equation is defined as:

$$L = -10n \log(d) + A$$

where A is a RSSI value at a 1-metre distance, n is a path-loss exponent, d is a distance in metres, and L is a distance between a transmitting sensor device and a receiving sensor device; to generate a raw RSSI fingerprint for each sensor device.

2. The method of claim 1, wherein the fusion RSSI fingerprint comprises a level of accuracy based on a number (N) of sensor devices within the environment.

3. The method of claim 1, wherein the known locations in the environment comprise fixed geo-coordinates.

4. The method of claim 1, wherein the known locations are fixed locations in a building.

5. The method of claim 1, wherein the locations of the plurality of fixedly-positioned sensor devices remain unchanged with time.

6. The method of claim 5, wherein the fusion RSSI fingerprint is generated using a single-dimensional vector to represent a location.

7. The method of claim 6, wherein dimensions in the fusion RSSI fingerprint is represented by:

$$\text{Dimensions}=N+C(N,2)=N+N!/(2!(N-2)!)$$

where N is the number of sensor devices deployed within the environment and ! represents a factorial of a whole number.

8. The method of claim 7, wherein the sensor devices are deployed at different altitudes, such that each sensor device is associated with geo-coordinates and altitude parameters.

9. The method of claim 8, wherein the altitude parameters transform the 2D fusion fingerprint map into a 3D grid.

10. The method of claim 9, wherein the sensor devices measure the RSSI values of their clients and forward these measurements to the computing system.

11. The method of claim 10, wherein the computing system predicts locations values within unknown cells using estimation methods by considering measured values only.

12. The method of claim 10, wherein the estimation methods comprise a model using classification based on at least one of a Support Vector Machine (SVM) and a machine learning (ML) algorithm for fingerprint-based indoor localization, based on the signal strength received from the sensor devices.

13. The method of claim 12, wherein the predictions are refreshed periodically at predetermined intervals.

14. The method of claim 1, wherein the locations are represented as cells.

15. A method for indoor location comprising the steps of:
(a) fixedly-positioning a first sensor device in a first known location in an environment and fixedly-positioning a second sensor device in a second known location in the environment;
(b) causing the first sensor device to transmit a first radio signal to the second sensor device, and causing the second sensor device to transmit a second radio signal to the first sensor device;
(c) at the first sensor device, measuring a received signal strength indicator (RSSI) value of the second radio signal, and at the second sensor device, measuring a received RSSI value of the first radio signal;
(d) generating at least one Friis equation for each of the first radio signal and the second radio signal;
(e) generating a fusion RSSI fingerprint based on a raw RSSI fingerprint and a log-ratio RSSI fingerprint, the fusion RSSI fingerprint comprising a level of accuracy based on a number (N) of sensor devices within the environment; and
(f) repeating steps (a) to (e) at predetermined intervals to enhance prediction accuracy of regional fingerprints within the environment; and wherein the first known location and the second known location comprise permanent geo-coordinates.

16. The method of claim 15, wherein the first known location and the second known location are fixed locations in a building.

17. The method of claim 15, wherein the raw RSSI fingerprint is normalized.

18. The method of claim 15, wherein the log-ratio RSSI fingerprint is normalized.

19. The method of claim 15, wherein at least a 2D radio map is generated using the fusion RSSI fingerprint and a 3D radio map is generated using the fusion RSSI fingerprint and altitude parameters associated with the devices.

20. The method of claim 15, wherein the at least one Friis equation is defined as:

$$L=-10n\log(d)+A$$

where A is a RSSI value at a 1-metre distance, n is a path-loss exponent, d is a distance in metres, and L is a distance between a transmitting device and a receiving device.

21. A system for predicting cell fingerprints comprising:
a computing system comprising a processor and a memory storing instructions executable by the processor to cause the processor to at least:
receive measured RSSI values associated with a plurality of fixedly-positioned sensor devices, wherein the plurality of fixedly-positioned sensor devices are stationary in known locations in an environment and caused to transit radio signals to each other and measure characteristics of the received radio signals;
generate at least one Friis equation for each of the received radio signals, to generate a raw RSSI fingerprint for each sensor device;
generate a log-ratio RSSI fingerprint between a pair of sensor devices;
normalize the raw RSSI fingerprint and normalize the log-ratio RSSI fingerprint;
combine the normalized raw RSSI fingerprint and the normalized log-ratio RSSI fingerprint to form a fusion RSSI fingerprint comprising a level of accuracy based on a number (N) of sensor devices within the environment; and
receive updated measured RSSI values at predetermined intervals to enhance prediction accuracy of regional fingerprints within the environment;
wherein the plurality of fixedly-positioned sensor devices comprise fixed geo-coordinates.

22. The system of claim 21, wherein the at least one Friis equation is defined as:

$$L=-10n\log(d)+A$$

where A is a RSSI value at a 1-metre distance, n is a path-loss exponent, d is a distance in metres, and L is a distance between a transmitting device and a receiving device.

23. The system of claim 21, wherein the known locations in the environment are fixed locations in a building.

24. The system of claim 21, wherein the fusion RSSI fingerprint is generated using a single-dimensional vector to represent a location.

25. The system of claim 24, wherein dimensions in the RSSI fusion fingerprint are represented by:

$$\text{Dimensions}=N+C(N,2)=N+N!/(2!(N-2)!)$$

where N is the number of sensor devices deployed within the environment and ! represents a factorial of a whole number.

26. The system of claim 25, wherein the sensor devices are deployed at different altitudes, such that each sensor device is associated with geo-coordinates and altitude parameters.

27. The system of claim 26, wherein the sensor devices measure the RSSI values of their client devices and forward these measurements to the computing system.

28. The system of claim 27, wherein the locations are represented as cells, and the computing system predicts locations values within the remaining unknown cells using estimations methods by considering measured values only.

29. The system of claim 28, wherein the estimation methods comprise a model using classification based on at least one of a Support Vector Machine (SVM) and a machine learning (ML) algorithm for fingerprint-based indoor localization, based on the signal strength received from the sensor devices.

30. The system of claim 29, wherein the predictions are refreshed periodically at predetermined intervals.

* * * * *